(12) United States Patent
Best

(10) Patent No.: US 12,261,317 B2
(45) Date of Patent: Mar. 25, 2025

(54) GNSS RECEIVER WITH MAGNETICALLY ATTACHED POWER SOURCE FOR SURVEY SYSTEMS

(71) Applicant: Trimble Inc., Sunnyvale, CA (US)

(72) Inventor: Gregory C. Best, San Francisco, CA (US)

(73) Assignee: Trimble Inc., Westminster, CO (US)

( * ) Notice: Subject to any disclaimer, the term of this patent is extended or adjusted under 35 U.S.C. 154(b) by 329 days.

(21) Appl. No.: 17/858,240

(22) Filed: Jul. 6, 2022

(65) Prior Publication Data

US 2024/0014498 A1   Jan. 11, 2024

(51) Int. Cl.
| | | |
|---|---|---|
| H01M 50/262 | (2021.01) | |
| G01S 19/35 | (2010.01) | |
| H01M 50/213 | (2021.01) | |
| H01M 50/251 | (2021.01) | |
| H01M 50/296 | (2021.01) | |

(52) U.S. Cl.
CPC ........... *H01M 50/262* (2021.01); *G01S 19/35* (2013.01); *H01M 50/213* (2021.01); *H01M 50/251* (2021.01); *H01M 50/296* (2021.01); *H01M 2220/10* (2013.01)

(58) Field of Classification Search
None
See application file for complete search history.

(56) References Cited

U.S. PATENT DOCUMENTS

| | | |
|---|---|---|
| 7,750,774 B2 | 7/2010 | Fullerton et al. |
| 7,750,778 B2 | 7/2010 | Fullerton et al. |
| 7,800,471 B2 | 9/2010 | Fullerton et al. |
| 7,800,472 B2 | 9/2010 | Fullerton et al. |
| 7,800,473 B2 | 9/2010 | Fullerton et al. |
| 7,808,348 B2 | 10/2010 | Fullerton et al. |
| 7,817,006 B2 | 10/2010 | Fullerton et al. |
| 7,855,624 B2 | 12/2010 | Fullerton et al. |
| 7,961,068 B2 | 6/2011 | Fullerton et al. |
| 7,961,069 B2 | 6/2011 | Fullerton et al. |
| 8,179,219 B2 | 5/2012 | Fullerton et al. |

(Continued)

OTHER PUBLICATIONS

Extended European Search Report for Application No. 23180199.4-1206, mailed Dec. 7, 2023, 12 pages.

*Primary Examiner* — Whitney Moore
(74) *Attorney, Agent, or Firm* — Kilpatrick Townsend & Stockton LLP

(57) ABSTRACT

A receiver assembly or top unit for use in a survey system. A quick release assembly or interface, which is designed for simple construction and no moving parts, is provided in the receiver housing and battery pack that includes a pair of magnets such that the receiver housing is attached to the battery pack via magnetic attraction or forces rather than with threaded connections or a more complex disconnect with multiple moving parts. Each magnet is a permanent magnet that is programmed or encoded with multi-poles or patterns. The magnets are affixed to or within the receiver housing and battery pack such that an attractive magnetic force is generated between the two magnets only when the two housings are properly aligned. A small amount of rotation from this aligned configuration causes the two magnets to generate repelling or repulsion forces that facilitate ready disassembly or removal of the battery pack.

24 Claims, 6 Drawing Sheets

(56) References Cited

U.S. PATENT DOCUMENTS

| | | |
|---|---|---|
| 8,314,672 B2 | 11/2012 | Fullerton et al. |
| 8,373,527 B2 | 2/2013 | Fullerton et al. |
| 8,461,952 B1 | 6/2013 | Fullerton et al. |
| 8,593,242 B2 | 11/2013 | Fullerton et al. |
| 8,643,454 B2 | 2/2014 | Fullerton et al. |
| 8,648,681 B2 | 2/2014 | Roberts et al. |
| 8,760,250 B2 | 6/2014 | Fullerton et al. |
| 8,760,252 B2 | 6/2014 | Fullerton et al. |
| 8,816,805 B2 | 8/2014 | Fullerton et al. |
| 8,872,608 B2 | 10/2014 | Fullerton et al. |
| 8,963,668 B2 | 2/2015 | Fullerton et al. |
| 2011/0146590 A1 | 6/2011 | Giunta |
| 2020/0116870 A1 | 4/2020 | Yost |
| 2021/0190915 A1* | 6/2021 | Snyder .................. G01S 7/4861 |
| 2022/0011105 A1 | 1/2022 | Hotz et al. |

* cited by examiner

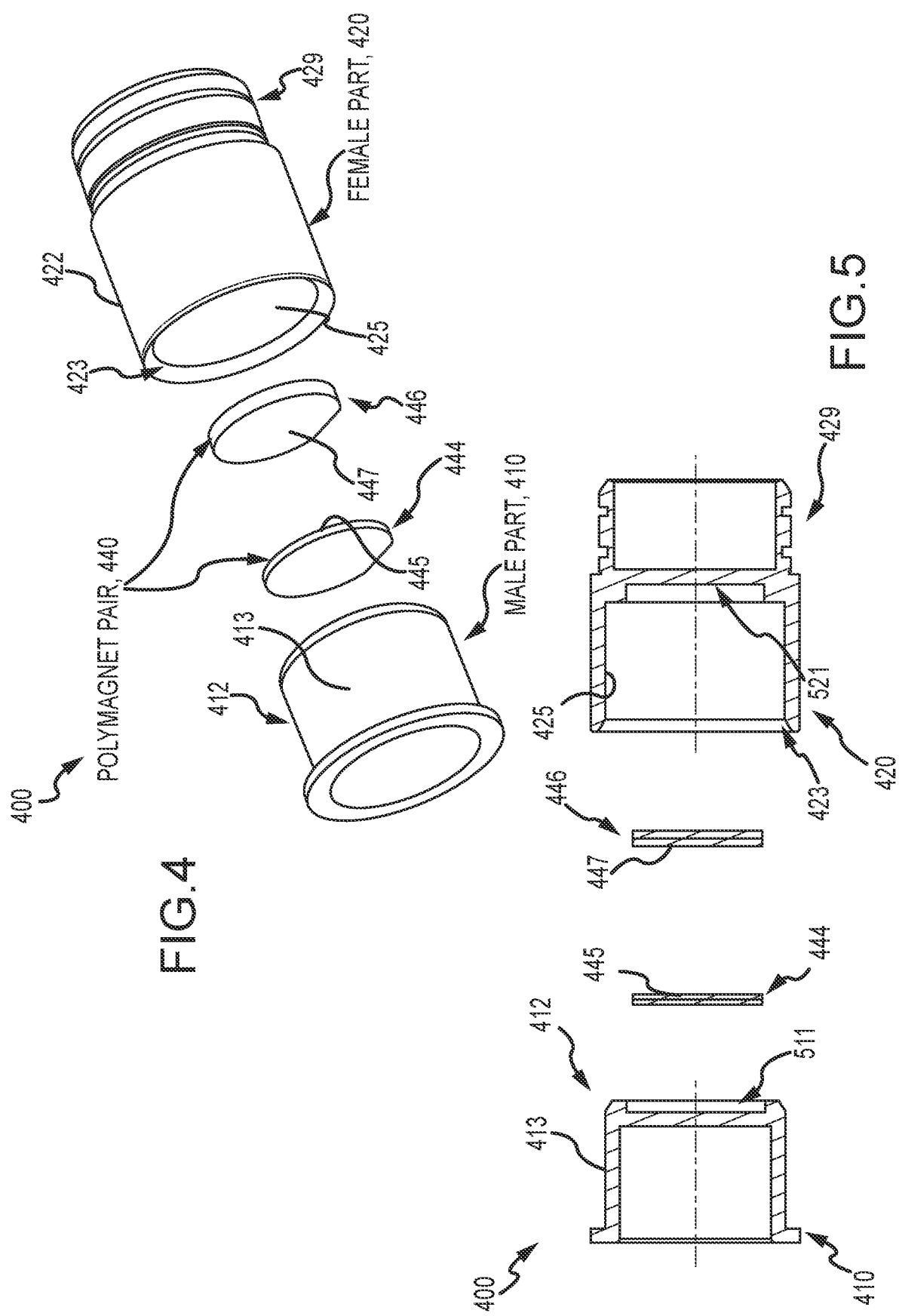

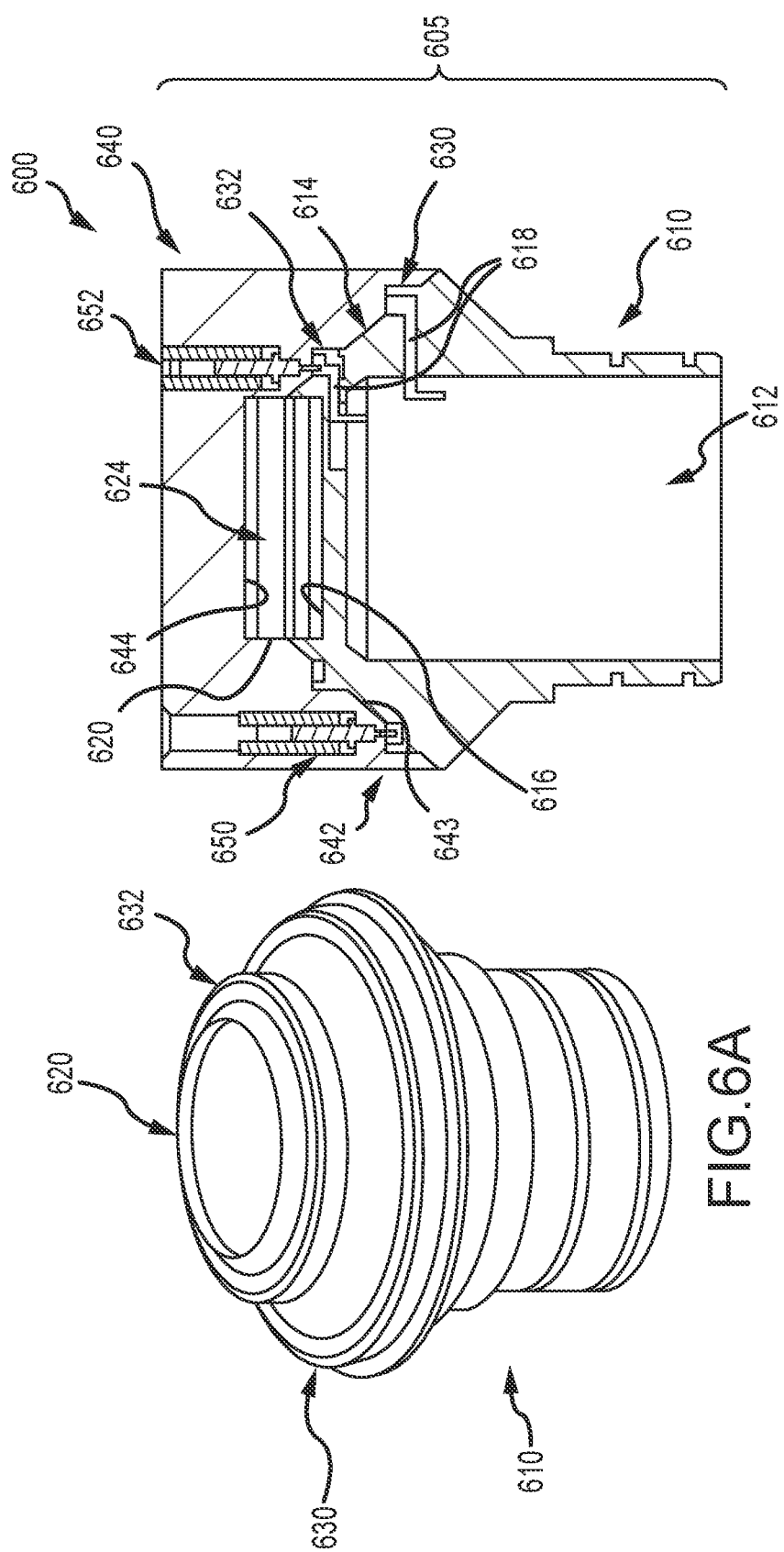

GNSS RECEIVER WITH MAGNETICALLY ATTACHED POWER SOURCE FOR SURVEY SYSTEMS

BACKGROUND

1. Field of the Description

The present description relates, in general, to Global Navigation Satellite System (GNSS) receivers configured to provide higher accuracy (e.g., centimeter-level) positioning and to survey systems including such receivers, with the systems typically including the top unit, mounting hardware, and a survey pole. More particularly, the present description relates to a survey field equipment assembly (such as may contain survey components such as a GNSS receiver, optical prisms, or other survey components) or "top unit" for a survey system with a detachable, quick release power source, e.g., battery pack.

2. Relevant Background

Surveying or land surveying is the technique of determining the terrestrial or three-dimensional (3D) positions of points and the distances and angles between them. These points are used to establish maps and boundaries for a wide variety of purposes including land ownership, locations, such as building corners or the surface location of subsurface features, or other purposes required by government or civil law, such as property sales. Surveyors presently work with survey systems that may include a GNSS (Global Navigation Satellite System) receiver and a data collector (one or both of which may be considered a "top unit") or other survey components making up a survey field equipment assembly that is mounted upon a survey pole or rod to perform data collection at a site or "in the field."

GNSS is a satellite system that is used to pinpoint the geographic location of a user's receiver anywhere in the world. GNSS systems that are currently in operation: the United States' Global Positioning System (GPS), the Russian Federation's Global Orbiting Navigation Satellite System (GLONASS), the European Galileo, the Chinese Beidou, and Indian NAVIC, and the Japanese QZSS. GNSS surveys use the signals transmitted by satellites with trajectories such that any point on the Earth's surface can be determined around the clock and independent of weather conditions. The positioning accuracy depends on the type of GNSS receiver and on the observation and processing techniques used. Many GNSS systems today enable a diverse range of survey tasks with user-guided onboard applications (e.g., surveying or control software running on the data collector) to be carried out with centimeter accuracy in real-time kinematic (RTK) or post data collection processing.

The positioning accuracy or precision of the data collected by the survey system can also be affected by mechanical parameters or aspects of the system and its assembly. The GNSS receiver assembly or top unit of a survey system is generally mechanically coupled to or mounted on a top end of a survey rod (i.e., end opposite the tip that is inserted into or placed on the ground), and this mounting may be achieved in a number of ways including a threaded connect, a mechanical quick disconnect, or the like. Additionally, the power source or battery pack is provided as part of the receiver assembly or top unit in a replaceable manner with the receiver or receiver unit/assembly to facilitate replacement of the power source in the field as needed.

There is a continuing need for a better way to power survey systems. The antenna of the receiver is often very lightweight and packaged in a small housing, which may be shaped like a thin disk, but the receiver (antenna, data collector components, and the like) are powered with a relatively large and heavy battery pack. The surveyor may carry one or more spare battery packs and swap them out in the field, and there is an ongoing need for top unit designs for survey systems that can make it easier to swap out the battery pack or power source while retaining proper alignment of the survey system components.

SUMMARY

To address these and other challenges, a receiver assembly or top unit is provided for use with a survey pole in a survey system. The receiver of the top unit may be configured as a GNSS receiver with a patch antenna or the like in an antenna or receiver housing, and the top unit or receiver assembly also includes a power source assembly or battery pack. The power source assembly is uniquely configured for ready swap out and replacement as it is detachable from the antenna or receiver housing in a manner that ensures alignment between the receiver housing and the power source assembly.

The inventor recognized that there are numerous drawbacks with the existing quick-release devices used within survey systems. One common quick release has numerous parts, including moving parts, that make it expensive to manufacture and also difficult operate. Further, this exemplary quick release has excessive play between the receiver housing and the attached part, which can make it difficult to properly calibrate the survey system. It is desirable to provide a very stable connection to facilitate calibration, but threaded connections have also proven ineffective as misthreading or failure to fully rotate to a final position can be troublesome because if the battery pack is just a small amount out of alignment (e.g., angular alignment, vertical mispositioning, and so on) the accuracy of the survey system can be significantly reduced.

More particularly, a survey system such as may be used for processing satellite signals, e.g., from GNSS satellites or the like. The system includes a survey field equipment assembly including a housing enclosing one or more survey components (e.g., a receiver with an antenna and electronics for receiving satellite signals). The assembly also includes a battery pack including a housing with an interior compartment configured for receiving one or more cells or batteries. Significantly, the assembly also includes a quick release mechanism. This mechanism includes a pair of magnets each encoded with a polarity pattern (e.g., a pair of smart magnets or programmed (or programmable) magnets) so that they generate an attraction force when the pair of magnets are positioned with mating faces parallel and substantially proximate to each other and with the polarity patterns aligned. A first one of the pair of magnets is positioned on the receiver housing and a second one of the pair of magnets is positioned on the housing of the battery pack.

The first and second magnets each may be a disk-shaped smart or programmed magnet selected or tuned such that the polarity patterns are wherein the polarity patterns are only aligned when the first and second magnets are in predefined discrete angular orientations. In some cases, the polarity patterns are aligned with the first magnet in a single angular orientation relative to the second magnet. The pair of magnets can be programmed or engineered with an asymmetric magnetic polarity pattern to generate a repulsing or push force when positioned with the mating faces parallel and proximate to each other and the pole patterns misaligned, while other implementations may be configured to provide neutral or negligible pull force (relative to the aligned state) when the magnets are in the non-aligned state. In some embodiments, the attraction force is greater than 10 pounds (e.g., 15 or more pounds) and is greater than the repulsing or push force (e.g., by at least 3 to 8 pounds), whereby disassembly or disconnection quick release mechanism is assisted by the pair of magnets.

In some embodiments, the quick release mechanism further includes a female part with a recessed surface defined by a sidewall, and the first one of the pair of magnets can be positioned at a bottom portion of the recessed surface. In such embodiments, the quick release mechanism further can include a male part with a sidewall with an outer surface configured for mating with the recessed surface of the female part, and the second one of the pair of magnets can be positioned at a top portion of the sidewall of the male part. In practice, the female part is typically provided on a lower surface of the receiver housing, and the male part is provided on an upper end of the housing of the battery pack. In some useful embodiments, the recessed surface is angled outward at an angle in the range of 30 to 60 degrees (e.g., at 45 degrees), with the outer surface of the male part being similarly inwardly angled.

In some implementations, the quick release assembly further includes a set of electrical contacts including contact rings spaced apart and encircling the outer surface of the sidewall of the male part and at least one contact for each of the contact rings extending to or through the recessed surface of the sidewall of the female part, whereby the set of electrical contacts mate with the at least one contact when the quick release mechanism is assembled with the pair of disk magnets positioned with mating faces parallel and proximate to each other and with the pole patterns aligned. In such implementations, the at least one contact for each of the contact rings can include three contacts for each of the contact rings, and the three contacts can be angularly spaced apart to form a triangular contact pattern with the contact rings when the quick release mechanism is assembled. In some embodiments, the housing of the battery pack is cylindrical and the interior compartment is cylindrical and configured for receiving at least two of the one or more cells/batteries each arranged with a longitudinal axis parallel to a longitudinal axis of the interior compartment. In general, there are two approaches to making contact. Discrete contacts on one side contacting discrete contacts on the mating side or discrete contacts on one side contacting slip rings on the mating side. In one useful design, there is a ring of discrete contacts on both sides.

According to some aspects of the description, a survey system can be provided that includes the receiver assembly described above. In such cases, the survey system may include a survey rod (or pole) and a second quick release mechanism. The second quick release mechanism may include a second pair of magnets each encoded with a polarity pattern to generate an attraction force when the second pair of magnets are positioned with mating faces parallel and substantially proximate to each other and with the polarity patterns aligned. A first one of the second pair of magnets can be positioned on the housing of the battery pack at an end opposite the location of the second one of the pair of magnets and a second one of the second pair of magnets is positioned on an upper end of the survey rod.

In this survey system, the second quick release mechanism further can include a female part with a recessed surface defined by a sidewall, and the first one of the second pair of disk magnets is positioned at a bottom portion of the recessed surface. Further, the second quick release mechanism may further include a male part with a sidewall with an outer surface configured for mating with the recessed surface of the female part of the second quick release mechanism. The second one of the second pair of magnets can be positioned at a top portion of the sidewall of the male part, and the female part of the second quick release mechanism can be provided on a lower end of the housing of the battery pack. The male part of the second quick release mechanism can be provided on the upper end of the survey rod.

In the survey system, the polarity pattern of the second quick release may use a substantially similar polarity pattern as the first quick release mechanism with the polarity pattern of the first quick release mechanism allowing them to generate significant attraction force when brought together. In other cases, the polarity pattern of the second quick release mechanism may use a substantially dissimilar polarity pattern as the first quick release mechanism preventing the components from generating significant attraction force when brought together. In still other cases, the polarity pattern of a male magnet in the first quick release mechanism can be used for a female magnet in the second quick release mechanism preventing significant attraction force from being generated when the components are brought together.

BRIEF DESCRIPTION OF THE DRAWINGS

FIG. 4 is an exploded perspective view of one embodiment of a quick release mechanism of the present description such as may be used in the survey system of FIGS. 1 and 2;

FIG. 5 is a side sectional view of the quick release mechanism of FIG. 4;

FIGS. 6A and 6B illustrate a top perspective view of a male part of a quick release mechanism and a sectional side view of the quick release mechanism with the male part mated with a female part and the magnet pair in the locked or aligned and attracting position.

DETAILED DESCRIPTION

Briefly, the following description is directed toward a receiver assembly or top unit for use in a survey system. The receiver assembly is designed to making swapping our or replacing battery packs an easy task for surveyors to accomplish in the field without tools and with an assurance that the battery pack would always be properly aligned with the receiver (i.e., with the receiver housing containing the GNSS antenna and associated components being powered by the battery pack). Furthermore, the assembly is designed to minimize the additional volume required to support replaceable batteries by eliminating nested cavities and battery doors and by arranging the battery cells in a manner that permits efficient packing in shapes that are best suited to the surveyors rod/pole and receiver. A quick release assembly or interface, which is designed for simple construction and no moving parts, is provided in the receiver housing and battery pack (or power source assembly) that includes a pair of magnets such that the receiver housing is attached to the battery pack via magnetic attraction or forces rather than with threaded connections or a more complex disconnect with multiple moving parts.

Each magnet is a permanent magnet that is programmed or encoded with multi-poles or patterns (e.g., asymmetric patterns), and these magnets may be interchangeably labeled multi-pole encoded magnets, smart magnets, programmed magnets, or the like (or more simply, herein, labeled "smart magnets"). The magnets are affixed to or within the receiver housing and battery pack such that an attractive magnetic force is generated between the two magnets only when the two housings are properly aligned. A small amount of rotation or movement between the housings from this aligned configuration causes the two magnets to lose attraction and/or generate repelling forces that facilitate ready disassembly or removal of the battery pack, while also providing a signal to the surveyor (or user of the survey system) that proper alignment has not yet been achieved during assembly. With this new receiver assembly design, the battery pack is readily detachable in the field and, importantly, can only be mounted onto the receiver housing (or vice versa) in one or more discrete configurations in which the receiver is accurately and properly aligned with the battery pack and survey rod. Accurate alignment between system components allows more robust integration of multi-sensor data, permits higher accuracy positioning, and permits integration with virtual and augmented reality (VR and AR) systems. This and other advantages of the receiver assembly design will become apparent from the following description with reference to the attached figures.

Figure 1:
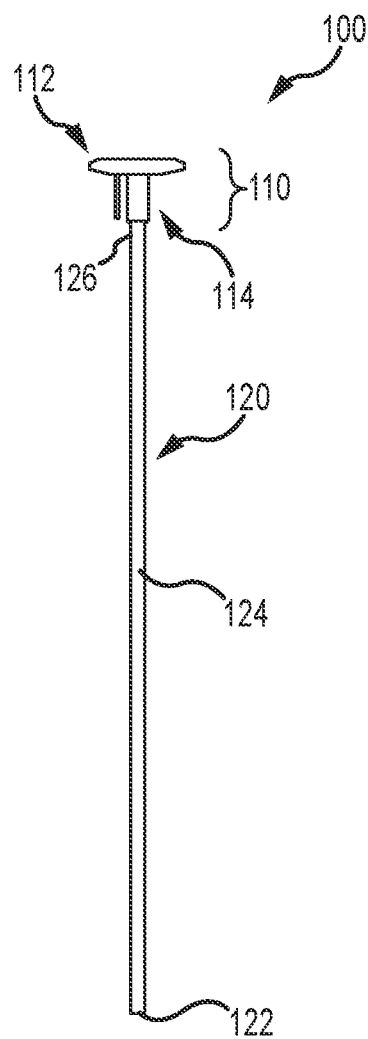
FIG. 1 is a side view of a survey system that includes a receiver assembly or top unit according to the present description.

FIG. 1 illustrates a survey system 100 that may incorporate the quick release and/or other design features described herein. As shown, the system 100 includes a receiver assembly or top unit 110 and a survey rod (or pole) 120. The survey rod 120 has an elongated and, typically, cylindrical body 124 that extends from a first end or tip, which is placed on the point to be measured during system use, to a second or upper end 126. The second end 126 is coupled to receiver assembly 110, such as via use of a quick release assembly as discussed for use within the receiver assembly 110, such that the receiver assembly 110 is physical supported in a carefully aligned manner by the survey rod 120 during use to perform surveying. The receiver assembly 110 includes a receiver (e.g., a GNSS receiver or the like) 112 coupled mechanically and electrically to a power source assembly or battery pack 114. As shown, the battery pack 114 is coupled to the top end 126 of the rod 120 at a first or lower end 116 and to the receiver 112 (or its housing as discussed below) at a second or upper end 118. Both of these mechanical interfaces may be provided using the quick release assembly or mechanism described herein making use of a pair of magnets to provide both the coupling force and also to assure proper alignment. Note, the survey rod 120 is just one illustration of the use of the concepts discussed herein. In other systems 100 there may not be a pole, and the receiver assembly 110 may be mounted on a machine or a vehicle. In such systems 100, the receiver assembly 110 may include the battery pack 114 as shown or the quick release mechanism may be connected directly to the machine/vehicle mount with a mating connector that would provide power (e.g., via the vehicle or machine power bus).

Figure 2:
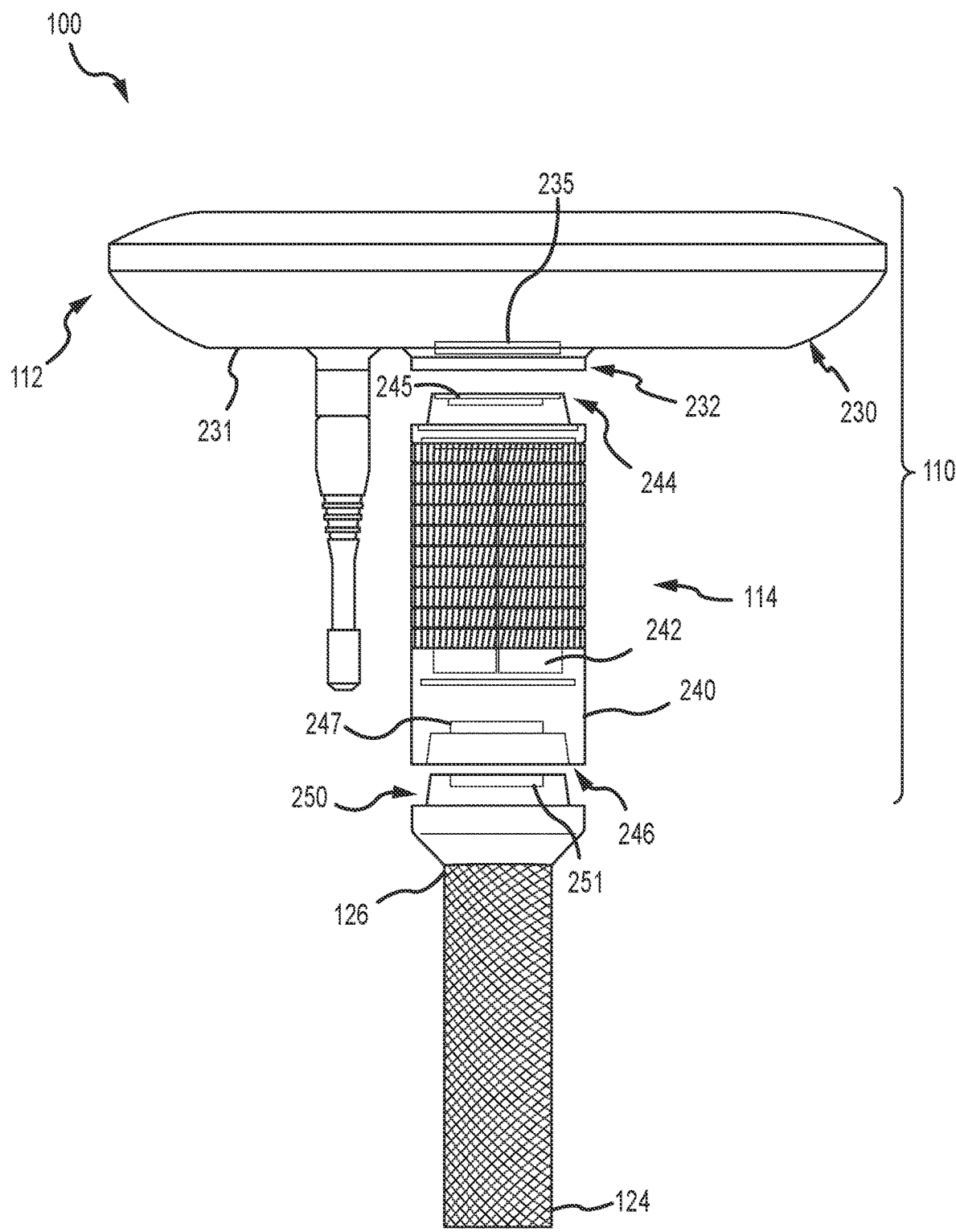
FIG. 2 is an exploded and enlarged view of the upper portion of the survey system of FIG. 1 showing additional details of the quick release mechanism of the present description, with housing components shown transparent to allow viewing of internal components including the pairs of magnets in each quick release mechanism.

FIG. 2 is an exploded and enlarged view of the upper portion of the survey system 100 of FIG. 1 showing additional details of the quick release mechanism of the present description. As shown, the top unit or receiver assembly 110 includes the receiver 112 and the power source assembly or battery pack 114, which are detachably coupled during use via a quick release mechanism. Particularly, the battery pack 114 includes a housing 240, which may preferably be a hollow cylinder as described in more detail below, that is configured for storing one, two, three, four, or more batteries or battery cells (or simply "cells") 242 within an inner space or void. It is a characteristic of the invention that one receiver 112 may be used with battery packs 114 of different physical size and electrical capacity by interfacing through a common quick release interface. A male part or component 244 of a quick release or disconnect mechanism is provided in a first or upper end of the battery pack housing 240, and a first magnet 245 of the quick release mechanism's magnet pair is positioned within the male part 244, typically flush with the first end's outer surface as shown in FIG. 2.

The receiver 112 includes a housing (or body) 230, which may be disk-shaped and generally hollow to receive and protectively house a GNSS patch or other antenna and associated components useful for implementing a receiver 112 of a survey system 100. The quick release mechanism used to couple the receiver 112 to the power source 114 includes a female part or component 232, which is configured (e.g., with an opening with a diameter and depth) to receive the male part 244. A second magnet 235 of the quick release mechanism's magnet pair is positioned within the female part 232 at a depth matching or selected to suit the height of the male part 244 such that the inner surfaces of the walls of the female part 232 receive and guide the outer surface of the outer walls of the male part 244 so as to position the pair of magnets 235, 245 parallel to and adjacent to (such as within 2 mm or less to in abutting contact) each other when the receiver 112 is attached to the battery pack 114.

For assembly, after initial insertion of the male part 244 into the female part 232, the power pack housing 240 is rotated about its longitudinal axis clockwise or counterclockwise until the poles or polarity patterns of the magnets 235 and 245 are aligned to generate a relatively strong attractive force, which also results in the receiver 112 and the battery pack 114 being properly aligned with each other to facilitate accurate surveying with the system 100. In a preferred embodiment, the polarity pattern of the magnets 235, 245 will introduce some amount of rotational torque to pull the magnets 235, 245 into proper alignment. For disassembly, the power pack housing is rotated about its longitudinal axis either clockwise or counterclockwise to break the attraction between the magnets 235 and 245 and also to cause the unaligned magnets 235 and 245 to generate a repulsing force to assist in detaching the battery pack 114 from the receiver 112. In some embodiments, the magnetic design will not transition into repulsion but the pull force is significantly reduced (or even made zero or neutral) to make disassembly easier in the unaligned or non-aligned state.

It will be understood by those skilled in the arts that the rotation is a relative motion so the receiver 112 could instead be rotated and the battery pack 114 held stationary or both may be rotated to achieve the relative movement of the two magnets 235 and 245 in the quick release or disconnect mechanism of the receiver assembly 110 as described. Further, the location of the male and female components of the quick release mechanism may be reversed with the receiver housing 230 having the male part and the battery pack housing 240 having the female part.

In the survey system 100, a second quick release mechanism is provided for detachably coupling in an aligned manner the pole 120 to the receiver assembly or top unit 110. To this end, the second or lower end of the battery pack housing 240 includes a female part or component 246 of a quick release mechanism, with sidewalls defining a generally cylindrical recessed surfaces at the bottom of which is positioned a first magnet 247 of the magnet pair for this quick release mechanism. The top or second end 126 of the pole body 124 is configured as or with a male part or component 250 of the quick release mechanism, with outer walls supporting a second magnet 251 of the magnet pair of the quick release mechanism.

In use (such as to allow replacement of a battery pack 114 with a charged one), the male part 250 is inserted into the female part 246 with the inner surfaces of the sidewalls of the female part 246 receiving and guiding the positioning of the second magnet 251 parallel to and substantially proximate to (e.g., contacting up to a 2 mm spacing or the like depending on the specific magnets chosen for system 100) the first magnet 247. With the magnets 247, 251 positioned in this way, the pole 120 can be rotated about its longitudinal axis until the magnets 247 and 251 are aligned and generate an attractive force that couples the pole 120 to the top unit or receiver assembly 110. Disassembly simply requires a small rotation (e.g., 15 to 45 degrees or the like) to misalign the magnets 247 and 251, which, as a result of this misalignment in their encoded pole pattern, generate a reduced attractive/pull force or even a repulsing force assisting the quick disconnect or release function.

As discussed above, the magnets of the magnet pairs of the quick release assemblies may take a range of forms to practice the invention. In general, the magnet pairs are permanent magnets that may be smart magnets as they are each encoded with a pattern providing multi-poles, and these patterns are designed such that the magnets (e.g., circular disk magnets or the like) generate an attraction or pull force when the magnets are placed parallel and proximate to each other with their patterns properly aligned. Note, there may be only one angular position that provides alignment and a strongest attractive force (and a mechanical feature may be added to limit alignment to this one angular position), but, in many embodiments, the strongest attractive force is achieved when the magnets are in one or more discrete angular alignments. If the magnets are rotated a small amount (e.g., 15 to 45 degrees), the attractive or pull force is quickly diminished or lost and, in some cases, even replaced with a repulsive or push force. In some cases, these magnets, e.g., smart magnets, engineered or encoded/programmed magnets, or the like, are designed such that the attraction force is greater than the repulsive force, which is useful in achieving proper alignment of the two magnets of the magnet pair when used in a quick release mechanism.

Figure 3A:
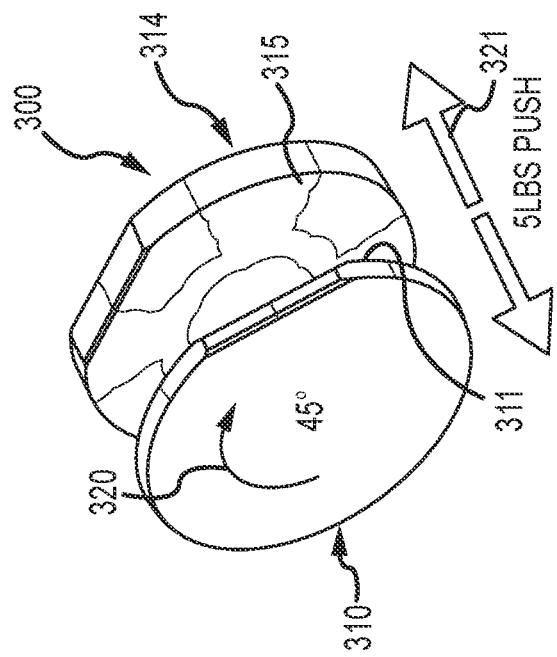
FIGS. 3A and 3B illustrate a magnet pair in aligned and misaligned configurations as may occur during use in a quick release mechanism of the present description.
Figure 3B:
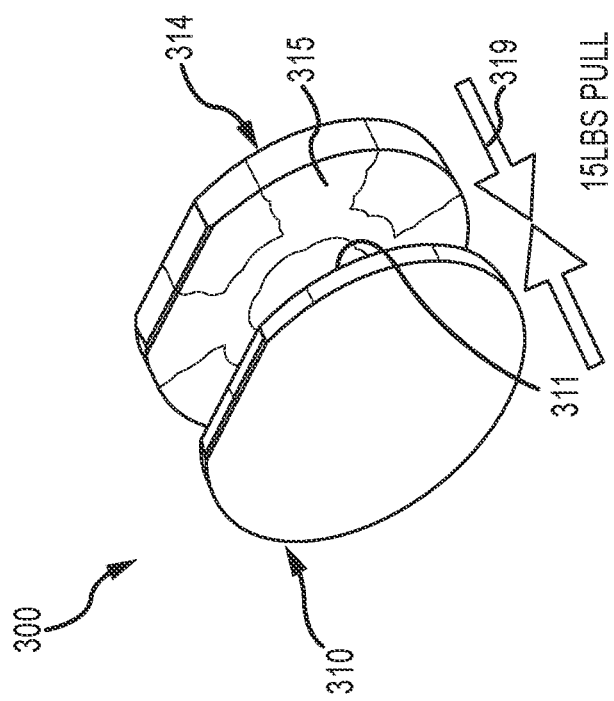

Such a pairing of magnets encoded with a multi-pole pattern is shown in FIGS. 3A and 3B. In FIG. 3A, the first and second magnets 310 and 314 are shown to be disk-shaped magnets each with an encoded multi-pole pattern on a mating surface 311 and 315. In FIG. 3A, the mating surfaces 311 and 315 are positioned parallel and proximate to each other and also the encoded multi-pole pattern is aligned (e.g., magnet 310 is in the one angular position relative to the magnet 314 that aligns the asymmetric magnet pattern built into these smart magnets), which results in an attractive or pull force 319 being generated causing the magnets 310 and 314 to lock together or to be coupled or engaged by magnetic forces created by the magnet pair. The pull force 319 is shown to be 15 pounds but a range of pull forces may be useful to suit the weight of the battery pack and pole (as the quick release mechanism of the receiver assembly may be configured to support the combined weight of these two components from the receiver), and, in some cases, the pull force is selected to be in the range of 5 to 100 pounds.

In FIG. 3B, the mating surfaces 311 and 315 are positioned parallel and proximate to each other but rotation (e.g., 15 to 45 degrees or more) 320 of one magnet 310 or 314 (or both magnets 310 and 314) has caused the pole pattern of the magnets 310, 314 to be misaligned, which results in the magnets generating a repulsive or push force 321 causing the magnets 310 and 314 to tend to move away from each other and assist in disconnecting two components containing these magnets 310, 314 (or two halves of a quick release mechanism). As shown, the push force 321 is less than the pull force 319 at 5 pounds, and this difference can be tuned to suit a particular application (e.g., does not have to be three times as large and the push force can be in the range of 0 to 10 pounds or the like in many cases). In applications where an "ejection" feel is not desirable, the polarity pattern may be designed to present a significantly reduced pull force, which would facilitate manual separation of the parts rather than providing a push.

At this point in the description, it may be useful to describe in more detail exemplary implementations of the quick release mechanism, initially with emphasis on the mechanical interface achieved and then proceeding with features useful for achieving electrical connections within the quick release mechanism, which is desirable for the quick release mechanism in the receiver assembly or top unit. FIG. 4 is an exploded perspective view of one embodiment of a quick release mechanism 400 of the present description such as may be used in the survey system 100 of FIGS. 1 and 2, and FIG. 5 is a side sectional view of the quick release mechanism 400 of FIG. 4.

The quick release mechanism 400 includes a male part 410 and a female part 420, with one being provided on the battery pack housing and the other provided on the receiver housing or the pole top end. The male part 410 has a cylindrical sidewall 412 with an outer surface 413, and a first smart magnet 444 of a magnetic pair 440 is positioned within a recessed surface 511 at the end of the sidewall 412 such that a mating surface 445 is flush with an outer surface of the male part 410 and such that the disk-shaped smart magnet 444 is orthogonal to a longitudinal or center axis of the male part 410. In other embodiments, the magnet 444 is not placed on a recess surface but, instead, it is provided through an opening from within the housing. The mating side of the surface leaves enough additional depth to place a protective label over the face of the magnet 444 that would be flush with the top surface.

The female part 420 also has a cylindrical sidewall 422 that has a circular opening 423 at one end that exposes a void or space within the female part 420 defined in part by the inner surface 425 of the sidewall 422. The opening 423 and inner surface 425 have a diameter that is at least as large as the outer diameter of the sidewall 412 such that the male part 412 can be inserted into the female part 420 during assembly of the quick release mechanism 400, with the inner surface 423 guiding travel of the male part 410 via contact with outer surface 413 of sidewall 412. A second smart magnet 446 of the magnet pair 440 is positioned within a recessed surface 521 at the bottom of the void or space in the female part 420 such that a mating surface 447 of the magnet 446 faces the void or space and the disk-shaped smart magnet 446 is orthogonal to a longitudinal or center axis of the female part 420 and such that when the male part 410 is inserted into the female part 420 the two mating surfaces 445 and 447 of magnets 444 and 446 are parallel and proximate to each other.

The length of the sidewall 412 is chosen to match or nearly match the depth of the void or space defined by the inner surface 423 of the sidewall 422 to provide such relative positioning of the magnets 444, 446. Then, to complete coupling or quick connect, one or both of the parts 410, 420 is rotated to align the coded pattern on the surfaces 445, 447 to obtain the pull force and lock the magnets 444, 446 together. In some instances, the design of the magnets will introduce enough torque to rotate themselves into proper alignment. No threads are required on the surfaces 413 and 423, and no moving parts or components are provided on either of the parts 410, 420, which makes the quick release mechanism 400 easy to assembly in the field and less complex and expensive to manufacture.

With the general mechanical interface of the quick release design understood, it may be useful to describe additional embodiments showing features for providing electrical and data connections with the quick release mechanism. FIG. 6A illustrates a top perspective view of a male part 610 of a quick release mechanism 605 while FIG. 6B illustrates a sectional side view of the quick release mechanism 605 with the male part 610 mated with a female part 640 and the pair of smart or engineered magnets 520 and 624 in the locked or aligned and attracting position retaining the male part 610 against the female part 640 via magnetic attraction or pull forces.

As shown, the quick release mechanism 605 differs mechanically from the mechanism 400 in that the mating surfaces are angular rather than being parallel to the longitudinal axes of the male and female parts. Specifically, male part 610 includes a sidewall 614 at the mating end that is angled inward toward the center or longitudinal axis at an angle in the range of 30 to 60 degrees with 45 degrees (as measured from the outer periphery of the male part 610) being shown. The female part 640 includes a recessed space or void defined in part by a sidewall 642 that is angled outward (as measured from a central axis of the female part 640) at a similar angle in the range of 30 to 60 degrees with 45 degrees being shown.

In this manner, the inner surface 643 of the sidewall 642 defines an opening for receiving the mating end of the male part 610 and guides and contacts the angled outer surface of the sidewall 614 of the male part 610. This mechanical interfacing during assembly of the mechanism 605 accurately guides a recessed surface 616 at the end or tip of the male part 610 in which a first magnet 620 of the mechanism's magnet pair to a position adjacent or proximate to a recessed surface 644 in the female part 640 at the bottom of the void or space defined by the inner surfaces 643 of sidewalls 642 in which a second magnet 624 of the mechanism's magnet pair. In this way, the two magnets 620, 624 are positioned parallel to each other and rotation of one or both parts 610, 640 can be performed (or rotation will occur due to the magnets 620, 624 approaching each other as their polarity pattern may be sufficient to pull them into final alignment) until the pole pattern of the smart magnets 620, 624 are aligned causing the magnets 620, 624 to generate an attraction or pull force locking the magnets 620, 624 and attached parts 610, 640 in a predefined proper alignment to each other.

The quick release mechanism 605 is also configured to provide electrical and data connections between the male part 610 and the female part 640. As illustrated, the female part 640 is configured for inclusion on a receiver housing while the male part 610 is configured for use on the end of a battery pack, but this arrangement may be reversed in practice. A set of electrical contact rings (e.g., metallic slip rings) 630, 632 are provided on the outer surface of the sidewall 614 of the male part 610. In some useful embodiments, a set of discrete contacts is provided in a circle. Two contacts 630, 632 are shown in this power-only example with one providing an electrical contact for power and one an electrical contact for ground. However, in many useful embodiments, one, two, or more additional rings are included on the sidewall 614 to act as data contacts. Signal leads or wires 618 are run from contact rings 630, 632 to the interior space or compartment 612 of the male part 610, in which one to four or more batteries would be positioned during use (as discussed in further detail below) The female part 640 is shown to include contacts 650 and 652 for providing electrical (or data in some cases) connections to the contact rings 630, 632, respectively. These contacts 650, 652, in turn, would be connected via wiring (not shown) to components of the receiver housing to which the female part 640 is affixed or integrally formed so as to power these components.

In some embodiments, it is desirable to provide redundancy of connection between the electrical components of the receiver and the power pack. In such cases, the female part 640 may contain two, three, or more of each of the contacts 650 and 652 such that more than one connection is made with the contact rings 630 and 632. This is useful in some cases as the survey system in which the quick release mechanism 605 is used may involve vibrations and other forces, and it is desirable for the quick release mechanism 605 be adapted to provide a robust electrical and/or data connection. To this end, one preferred embodiment includes three of the contacts 650 and three of the contacts 652 (and three more if a data signal is included). The set of three contacts 650 and the set of three contacts 652 are arranged in a triangular or tripod arrangement about the rings 630 and 632, e.g., with each offset 60 degrees from the other two or adjacent ones of the contacts 650, 652). Hence, power, ground, and data signals are maintained by three separate couplings such that loss of one or two connections does not interrupt a signal.

In addition to the unique features provided by the quick release mechanism, the new battery pack or power source assembly design provides several additional advantages. The inventors recognized that existing battery pack designs included a battery door to the interior space or compartment of the housing, which can be problematic, and typically include significant empty or dead space in battery compartment of the housing. For example, typical battery door designs are complex in part due to the goal of providing an environmental seal against moisture, dirt, and the like. This can result in numerous parts (e.g., up to forty or parts is common just for the battery door), which increases manufacturing costs, can lead to complex assembly and use processes, and often leads to a great deal of repair and failure issues for the battery packs with battery doors. With regard to wasted space, a typical battery pack for a GNSS receiver is quite large with some packs including large dead space to fit inside a cylindrical receiver housing. The battery compartment may be three times the battery volume and five time the cell volume.

With these issues in mind, the inventor created a battery pack design that not only utilizes one or two quick release mechanisms but also eliminates the battery door and reduces the size requirements for the battery compartment. These design improvements are likely to be even more beneficial in future survey systems as it is anticipated in the industry that future receivers will have much larger power requirements. For example, some receiver designs may require up to twice the battery capacity to provide the same life as achieved with present battery packs, and this will likely increase the demand for better space utilization and heighten issues with battery doors in some cases.

The battery door issue is addressed by the new battery pack by the elimination of the battery door. Such a door-less design is shown with the battery pack 114 of the receiver assembly 110 in FIGS. 1 and 2. As shown, the housing 240 does not include a battery door. Instead, the battery or batteries 242 can be accessed for replacement and charging by removal of the components provided on the housing 240 as part of the quick release mechanism with the pole 120. In some embodiments, all or a portion of the female part 246 are detachable from the housing 240 to exposed the lower end of the battery compartment in which the battery or batteries 242 are stored. A simple mechanical coupling such as threading on the exterior walls of the female part 246 and interior surfaces of the housing can be used to attach the female part 246 of the quick release mechanism between the battery compartment and pole 120. Such an arrangement can be seen in more detail in FIGS. 4 and 5 that show a threaded portion on the female part 420 of the quick release mechanism 400, and this mechanism 400 may be used in the survey system 100 at least for the pole-to-battery compartment quick release mechanism.

With regard to the size of the battery compartment, the inventor determined that the battery pack housing should be cylindrical and utilize an improved battery arrangement to significantly reduce the size of the battery compartment required. To this end, the inventor recognized that existing battery packs typically pack the cylindrical batteries in a box (or rectangular-shaped interior space or compartment) that is then often placed within another box-shaped housing prior to being enclosed within a cylindrical-shaped outer housing selected to suit the receiver. In contrast, as shown in FIG. 2, the battery pack housing 240 may be cylindrical to house the battery or batteries 242.

Figure 7:
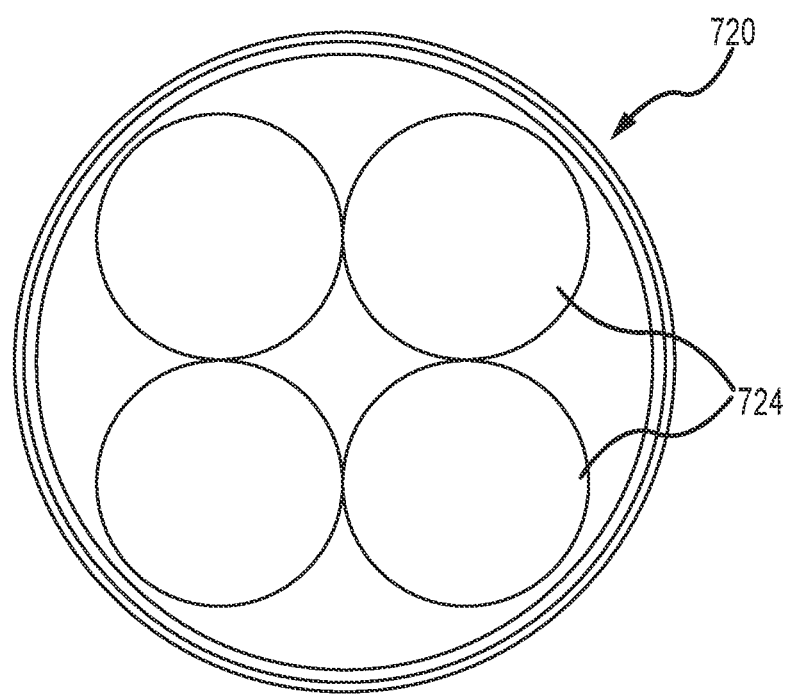
FIG. 7 is a top view of a battery compartment that may be provided in a battery pack of the present description to provide a space-saving packaging of cylindrical batteries.

FIG. 7 illustrates a battery compartment 720 that may be used within a cylindrical housing, such as housing 240. As shown, the compartment 720 is circular in cross section so as to define a cylindrical space or compartment in which a set of cylindrical batteries 724 may be placed. The compartment 720 may be defined by a portion of inner surfaces of the battery pack housing, such that the inner diameter of the compartment 720 may be equal to the outer diameter of the battery pack housing less the wall thickness of the housing 720. As shown, four cylindrical batteries 724 can be package within the compartment 720 in a space efficient manner, e.g., with an inner diameter of the compartment that is only a small amount greater than two times a battery outer diameter.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, disk magnets are shown in the figures but it will be understood by those skilled in the arts that the magnets could take many other forms to practice the invention including prismatic, a ball in socket-type design, and the like.

I claim:

1. A receiver assembly, comprising:
a survey field equipment assembly including a housing enclosing one or more survey components;
a battery pack comprising a housing with an interior compartment configured for receiving one or more cells; and
a quick release mechanism comprising:
a pair of magnets each encoded with a polarity pattern to generate an attraction force when the pair of magnets are positioned with mating faces parallel and substantially proximate to each other and with the polarity patterns aligned, wherein a first magnet of the pair of magnets is positioned on the housing enclosing the one or more survey components and a second magnet of the pair of magnets is positioned on the housing of the battery pack; and
a set of electrical contacts provided in a ring for providing one or more electrical connections between the housing enclosing the one or more survey components and the housing of the battery pack.

2. The receiver assembly of claim 1, wherein the first and second magnets each comprises a disk-shaped smart magnet and wherein the polarity patterns are only aligned when the first and second magnets are in predefined discrete angular orientations.

3. The receiver assembly of claim 2, wherein the polarity patterns are aligned with the first magnet in a single angular orientation relative to the second magnet.

4. The receiver assembly of claim 2, wherein the pair of magnets generate a repulsing or push force when positioned with the mating faces parallel and substantially proximate to each other and the polarity patterns mis-aligned and wherein the attraction force is greater than 10 pounds and is greater than the repulsing or push force, whereby disassembly or disconnection quick release mechanism is assisted by the pair of magnets.

5. The receiver assembly of claim 1, wherein the quick release mechanism further comprises a female part with mechanical guidance and alignment features and with a recessed surface defined by a sidewall, wherein the first one of the pair of magnets is positioned at a bottom portion of the recessed surface, wherein the quick release mechanism further comprises a male part with a sidewall with an outer surface configured for mating with the recessed surface of the female part, and wherein the second one of the pair of magnets is positioned at a top portion of the sidewall of the male part.

6. The receiver assembly of claim 5, wherein the female part is provided on a lower surface of the receiver housing and wherein the male part is provided on an upper end of the housing of the battery pack.

7. The receiver assembly of claim 5, wherein the recessed surface is angled outward at an angle in the range of 30 to 60 degrees.

8. The receiver assembly of claim 5, wherein the set of electrical contacts comprise contact rings spaced apart and encircling the outer surface of the sidewall of the male part and at least one contact for each of the contact rings extends to or through the recessed surface of the sidewall of the female part, whereby the set of electrical contacts mate with the at least one contact when the quick release mechanism is assembled with the pair of magnets positioned with mating faces parallel and substantially proximate to each other and with the polarity patterns aligned.

9. The receiver assembly of claim 8, wherein the at least one contact for each of the contact rings comprises three contacts for each of the contact rings and wherein the three contacts are angularly spaced apart to form a triangular contact pattern with the contact rings when the quick release mechanism is assembled.

10. The receiver assembly of claim 1, wherein the housing of the battery pack is cylindrical and the interior compartment is cylindrical and configured for receiving at least two of the one or more cells each arranged with a longitudinal axis parallel to a longitudinal axis of the interior compartment.

11. A survey system including the receiver assembly of claim 1, wherein the survey system comprises a survey rod and a second quick release mechanism comprising a second pair of magnets each encoded with a polarity pattern to generate an attraction force when the second pair of magnets are positioned with mating faces parallel and proximate to each other and with the polarity patterns aligned, wherein a first one of the second pair of magnets is positioned on the housing of the battery pack at an end opposite the location of the second one of the pair of magnets and a second one of the second pair of magnets is positioned on an upper end of the survey rod.

12. The survey system of claim 11, wherein the polarity pattern of the second quick release uses a substantially similar polarity pattern as the first quick release mechanism with the polarity pattern of the first quick release mechanism allowing them to generate significant attraction force when brought together.

13. The survey system of claim 11, wherein the polarity pattern of the second quick release mechanism uses a substantially dissimilar polarity pattern as the first quick release mechanism preventing the components from generating significant attraction force when brought together.

14. The survey system of claim 11, wherein the polarity pattern of a male magnet in the first quick release mechanism is used for a female magnet in the second quick release mechanism preventing significant attraction force from being generated when the components are brought together.

15. The survey system of claim 11, wherein the second quick release mechanism further comprises a female part with a recessed surface defined by a sidewall, wherein the first one of the second pair of magnets is positioned at a bottom portion of the recessed surface, wherein the second quick release mechanism further comprises a male part with a sidewall with an outer surface configured for mating with the recessed surface of the female part of the second quick release mechanism, wherein the second one of the second pair of magnets is positioned at a top portion of the sidewall of the male part, and wherein the female part of the second quick release mechanism is provided on a lower end of the housing of the battery pack and wherein the male part of the second quick release mechanism is provided on the upper end of the survey rod.

16. A receiver assembly for processing satellite signals, comprising:
a receiver including a receiver housing enclosing a GNSS antenna;
a battery pack comprising a housing with an interior compartment configured for receiving one or more batteries; and
a quick release mechanism comprising:
a pair of disk magnets;
a cylindrical female part with a recessed surface defined by a sidewall, wherein a first one of the pair of disk magnets is positioned at a bottom portion of the recessed
surface; and
a cylindrical male part with a sidewall with an outer surface configured for mating with the recessed surface of the cylindrical female part, wherein a second one of the pair of disk magnets is positioned at a top portion of the sidewall of the cylindrical male part,
wherein the cylindrical female part is positioned on the receiver housing and the cylindrical male part is positioned on the housing of the battery pack.

17. The receiver assembly of claim 16, wherein the first and second magnets each comprises a smart magnet programmed with a magnetic pole pattern to generate an attraction force when the pair of disk magnets are positioned with mating faces parallel and proximate to each other and with the magnetic pole patterns aligned and wherein the magnetic pole patterns are only aligned with the first magnet in a single angular orientation relative to the second magnet.

18. The receiver assembly of claim 16, wherein the quick release mechanism further comprises a set of electrical contacts comprising contact rings spaced apart and encircling the outer surface of the sidewall of the cylindrical male part and at least one contact for each of the contact rings extending to or through the recessed surface of the sidewall of the cylindrical female part, whereby the set of electrical contacts mate with the at least one contact when the quick release mechanism is assembled with the pair of disk magnets positioned with mating faces parallel and proximate to each other and with the pole patterns aligned, and wherein the at least one contact for each of the contact rings comprises three contacts for each of the contact rings and wherein the three contacts are angularly spaced apart to form a triangular contact pattern with the contact rings when the quick release mechanism is assembled.

19. The receiver assembly of claim 16, wherein the housing of the battery pack is cylindrical and the interior compartment is cylindrical and configured for receiving at least two of the one or more batteries each arranged with a longitudinal axis parallel to a longitudinal axis of the interior compartment.

20. A receiver assembly for processing satellite signals, comprising:
a receiver including a receiver housing;
a battery pack comprising a housing with an interior compartment configured for receiving one or more batteries, wherein the housing and the interior compartment are both cylindrical in shape and wherein the housing is free of a pivotal battery door providing access to the interior compartment; and
a quick release mechanism comprising a pair of disk magnets, wherein a first one of the pair of disk magnets is positioned on the receiver housing and a second one of the pair of disk magnets is positioned on the housing of the battery pack and wherein the pair of disk magnets provide a magnetic attraction force that detachably connects the receiver housing to the housing of the battery pack when the pair of disk magnets are positioned with mating faces parallel and proximate to each other and with an alignment with a predefined relative angular orientation.

21. The receiver assembly of claim 20, wherein the quick release mechanism further comprises a cylindrical female part with a recessed surface defined by a sidewall, wherein the first one of the pair of disk magnets is positioned at a bottom portion of the recessed surface, wherein the quick release mechanism further comprises a cylindrical male part with a sidewall with an outer surface configured for mating with the recessed surface of the cylindrical female part, wherein the second one of the pair of disk magnets is positioned at a top portion of the sidewall of the cylindrical male part, wherein the quick release mechanism further comprises a set of electrical contacts comprising contact rings spaced apart and encircling the outer surface of the sidewall of the cylindrical male part and at least one contact for each of the contact rings extending to or through the recessed surface of the sidewall of the cylindrical female part, whereby the set of electrical contacts mate with the at least one contact when the quick release mechanism is assembled with the pair of disk magnets positioned with mating faces parallel and proximate to each other and with the pole patterns aligned.

22. The receiver assembly of claim 21, wherein the at least one contact for each of the contact rings comprises three contacts for each of the contact rings and wherein the three contacts are angularly spaced apart to form a triangular contact pattern with the contact rings when the quick release mechanism is assembled.

23. A survey system including the receiver assembly of claim 20, wherein the survey system comprises a survey pole and a second quick release mechanism comprising a second pair of disk magnets each encoded with a pole pattern to generate an attraction force when the second pair of disk magnets are positioned with mating faces parallel and proximate to each other and with the pole patterns aligned, wherein a first one of the second pair of disk magnets is positioned on the housing of the battery pack at an end opposite the location of the second one of the pair of disk magnets and a second one of the second pair of disk magnets is positioned on an upper end of the survey pole.

24. The survey system of claim 23, wherein the second quick release mechanism further comprises a cylindrical female part with a recessed surface defined by a sidewall, wherein the first one of the second pair of disk magnets is positioned at a bottom portion of the recessed surface, wherein the second quick release mechanism further comprises a cylindrical male part with a sidewall with an outer surface configured for mating with the recessed surface of the cylindrical female part of the second quick release mechanism, wherein the second one of the second pair of disk magnets is positioned at a top portion of the sidewall of the cylindrical male part, and wherein the cylindrical female part of the second quick release mechanism is provided on a lower end of the housing of the battery pack and wherein the cylindrical male part of the second quick release mechanism is provided on the upper end of the survey pole.

\* \* \* \* \*